(12) United States Patent
Do et al.

(10) Patent No.: US 8,836,874 B2
(45) Date of Patent: Sep. 16, 2014

(54) THREE-DIMENSIONAL IMAGE DISPLAY APPARATUS INCLUDING SHUTTER PANEL

(75) Inventors: Hee Wook Do, Cheonan-si (KR); Seungbeom Park, Seoul (KR); Duckjong Suh, Seoul (KR); Sang-Gu Lee, Seoul (KR); Jieun Jang, Suwon-si (KR); Min Oh Choi, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 152 days.

(21) Appl. No.: 13/543,585

(22) Filed: Jul. 6, 2012

(65) Prior Publication Data

US 2013/0050597 A1 Feb. 28, 2013

(30) Foreign Application Priority Data

Aug. 23, 2011 (KR) .................. 10-2011-0084132

(51) Int. Cl.
*G02F 1/1335* (2006.01)

(52) U.S. Cl.
CPC .................................... *G02F 1/1335* (2013.01)
USPC ................. 349/15; 349/96; 349/117

(58) Field of Classification Search
CPC  G02F 1/0136; G02B 27/2214; G02B 27/225; G02B 27/2264; G02B 27/26; H04N 13/0402; H04N 13/0434; H04N 13/0409
USPC ............................................. 349/15, 96, 117
See application file for complete search history.

(56) References Cited

U.S. PATENT DOCUMENTS

| 7,576,829 | B2 * | 8/2009 | Kikuchi et al. | 349/175 |
|---|---|---|---|---|
| 8,199,291 | B2 * | 6/2012 | Kaihoko et al. | 349/119 |
| 8,558,960 | B2 * | 10/2013 | Yamazaki et al. | 349/43 |
| 2010/0238546 | A1 | 9/2010 | Hsu et al. | |
| 2012/0218325 | A1 * | 8/2012 | Hiroki et al. | 345/697 |

FOREIGN PATENT DOCUMENTS

| JP | 11-298918 | 10/1999 |
|---|---|---|
| KR | 10-0426244 | 3/2004 |
| KR | 10-0502798 | 7/2005 |

* cited by examiner

*Primary Examiner* — Mike Qi
(74) *Attorney, Agent, or Firm* — H.C. Park & Associates, PLC

(57) ABSTRACT

A three-dimensional image display apparatus includes a display panel configured to display an image and a shutter panel configured to separate the image into a left-eye image and a right-eye image. The shutter panel includes a first thin-film substrate disposed adjacent to the display panel, a second thin-film substrate facing the first substrate, and a liquid crystal layer disposed between the first substrate and the second substrate. The first substrate is disposed between the second substrate and the display panel.

30 Claims, 3 Drawing Sheets

THREE-DIMENSIONAL IMAGE DISPLAY APPARATUS INCLUDING SHUTTER PANEL

CROSS-REFERENCE TO RELATED APPLICATION

This application claims priority from and the benefit of Korean Patent Application No. 10-2011-0084132, filed on Aug. 23, 2011, which is hereby incorporated by reference for all purposes as if fully set forth herein.

BACKGROUND

1. Field

Exemplary embodiments of the present invention relate to a three-dimensional image display apparatus.

2. Discussion of the Background

In general, a three-dimensional (3D) image display apparatus includes a display panel and a shutter panel. The shutter panel separates a left-eye image and a right-eye image, which have a binocular disparity, and provides the left- and right-eye images to a left eye and a right eye of viewer, respectively. The viewer watches the left- and right-eye images through the two eyes respectively, thereby perceiving a 3D image.

The shutter panel includes two glass substrates having transparent electrodes, respectively, and a liquid crystal layer disposed between the two substrates as a liquid crystal panel structure. As liquid crystals of the liquid crystal layer employed in the shutter panel, nematic liquid crystals, smectic liquid crystals, or cholesteric liquid crystals may be used. Directors of the liquid crystals are tilted by an electric field generated between the transparent electrodes, and thus the light transmittance of the liquid crystal layer is controlled. Accordingly, brightness of the 3D image display apparatus depends on a cell gap between the two substrates and an anisotropic refractive index of the liquid crystals.

In addition, the glass substrates used for the shutter panel are very expensive, thereby causing increase in manufacturing cost of the 3D image display apparatus.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a 3D image display apparatus having a reduced thickness.

Additional features of the invention will be set forth in the description which follows, and in part will be apparent from the description, or may be learned by practice of the invention.

An exemplary embodiment of the present invention provide a three-dimensional image display apparatus including a display panel configured to display an image and a shutter panel configured to separate the image into a left-eye image and a right-eye image. The shutter panel includes a first substrate disposed adjacent to the display panel and being a thin film type, a second substrate facing the first substrate and being a thin film type, and a liquid crystal layer disposed between the first substrate and the second substrate. The first substrate is disposed between the second substrate and the display panel.

An exemplary embodiment of the present invention provide a three-dimensional image display apparatus including a display panel configured to display an image and a shutter panel configured to separate the image into a left-eye image and a right-eye image. The shutter panel includes a first thin-film substrate configured to receive light exiting from the display panel, a second thin-film substrate facing the first substrate, and a liquid crystal layer including a blue-phase liquid crystal. The liquid crystal layer is disposed between the first thin-film substrate and the second thin-film substrate. The liquid crystal layer may include nematic liquid crystals.

An exemplary embodiment of the present invention provide a three-dimensional image display apparatus including a display panel configured to display an image and a shutter panel configured to separate the image into a left-eye image and a right-eye image. The shutter panel includes a first thin-film substrate configured to receive light exiting from the display panel, a second thin-film substrate facing the first substrate, a liquid crystal layer disposed between the first thin-film substrate and the second thin-film substrate, and a polarizing film configured to generate a circularly polarized light.

According to the above, the 3D image display apparatus includes the thin film-shaped first and second substrates for the shutter panel. Thus, the manufacturing cost of the 3D image display apparatus may be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
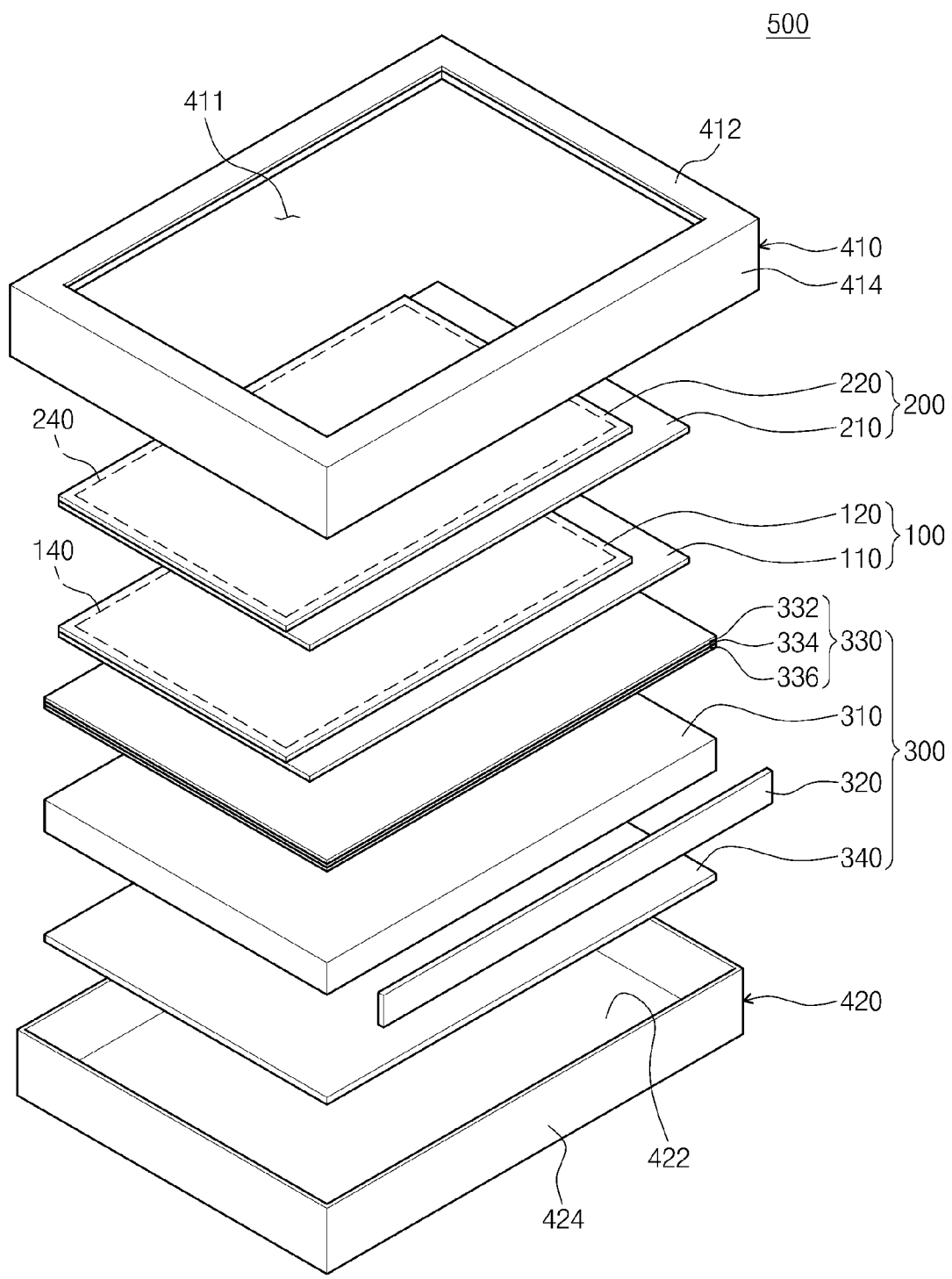
FIG. 1 is an exploded perspective view showing a 3D image display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "adjacent to", or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. Like numbers refer to like elements throughout. As used herein, the term "and/or" includes any and all combinations of one or more of the associated listed items.

FIG. 1 is an exploded perspective view showing a 3D image display apparatus according to an exemplary embodiment of the present invention.

Referring to FIG. 1, a 3D image display apparatus 500 includes a display panel 100, a shutter panel 200, a backlight unit 300, an upper cover 410, and a lower cover 420.

The display panel 100 may be various display panels, such as a liquid crystal display (LCD) panel, an electrophoretic display panel (EDP), an organic light emitting display (OLED) panel, a plasma display panel (PDP), etc. Hereinafter, the display panel 100 will be described as the liquid crystal display panel, but is not limited as such.

The display panel 100 may have a rectangular shape including a short side and a long side and displays an image on a display area 140 thereof. Further, the display panel 100 may include an array substrate 110, an opposite substrate 120 facing the array substrate 110, and a first liquid crystal layer (not shown) disposed between the array substrate 110 and the opposite substrate 120.

The array substrate 110 may include a plurality of pixels (not shown) arranged in a matrix form. Each pixel may include a gate line (not shown) extended in a first direction substantially parallel to a side of the array substrate 110, a data line (not shown) extended in a second direction substantially perpendicular to the first direction, and a pixel electrode (not shown). The data line is insulated from the gate line while crossing the gate line. Each pixel may include a thin film transistor (not shown) electrically connected to the pixel electrode to switch a driving signal applied to the pixel electrode. The thin film transistor may be electrically connected to the gate line and the data line.

Further, a driver IC (not shown) may be disposed adjacent to a side of the array substrate 110. The driver IC receives various signals from the outside and applies the driving signal to the thin film transistor in response to the signals to drive the display panel 100.

The opposite substrate 120 may include RGB color filters, each displaying a predetermined color using the light provided from the backlight unit 300, and a common electrode (not shown) disposed on the RGB color filters to face the pixel electrode. The RGB color filters may be formed on the opposite substrate 120 through a thin film process. The RGB color filters may be disposed on the opposite substrate 120, but are not limited as such. For example, the RGB color filters may be disposed on the array substrate 110.

The first liquid crystal layer includes liquid crystal molecules aligned in a specific direction in response to the voltage applied between the pixel electrode and the common electrode to control the transmittance of the light from the backlight unit 300, thereby displaying the image on the display panel 100.

Further, the display panel 100 may include a polarizing film (not shown) disposed at an optical path through which the light travels.

The shutter panel 200 may separate the image displayed on the display panel 100 into a left-eye image and a right-eye image. The shutter panel 200 may include a first substrate 210 on which an electric field forming electrode (not shown) is disposed, a second substrate 220 facing the first substrate 210, and a second liquid crystal layer 230 disposed between the first substrate 210 and the second substrate 220. The first substrate 210 and the second substrate 220 may be thin-film substrates. The second liquid crystal layer 230 may include blue-phase liquid crystals, and thus the shutter panel 200 may output the light having uniform brightness without being related to a gap between the first substrate 210 and the second substrate 220.

Further, the shutter panel 200 may include a polarizing film disposed at an optical path in which the light exiting from the shutter panel 200 travels. The shutter panel 200 may include a transmission area 240 corresponding to the display area 140 to transmit the image displayed on the display panel 100.

The backlight unit 300 may be disposed under the display panel 100. The backlight unit 300 may include a light guide plate 310, a light source part 320 including a plurality of light sources, an optical member 330, and a reflective sheet 340.

The light guide plate 310 may be disposed under the display panel 100 and guides the light provided from the light source part 320 to the display panel 100. Specifically, the light guide plate 310 may be overlapped with at least the display area 140 of the display panel 100. The light guide plate 310 may include an exit surface from which the light exits, a lower surface facing the exit surface, and side surfaces connecting the exit surface and the lower surface. Further, at least one of the side surfaces of the light guide plate 310 faces the light source part 320 to serve as a light incident surface to which the light from the light source part 320 is incident, and the surface facing the light incident surface may be a reflective surface that reflects the light traveling in the light guide plate 310.

The light guide part 320 may include a printed circuit board and a plurality of light emitting diodes mounted on the printed circuit board. Further, the light source part 320 may be disposed to face at least one side surface of the light guide plate 310 and to provide the light to the display panel 100 through the light guide plate 310.

The optical member 330 may be provided between the light guide plate 310 and the display panel 100. The optical member 330 may control the light exiting from the light guide plate 310. The optical member 330 may include a diffusion sheet 336, a prism sheet 334, and a protective sheet 332, which are sequentially stacked.

The diffusion sheet 336 may diffuse the light exiting from the light guide plate 310. The prism sheet 334 may condense the light diffused by the diffusion sheet 336 in a direction substantially vertical to a surface of the display panel 100. Thus, most of the light waves exiting from the prism sheet 334 may be vertically incident into the display panel 100. The protective sheet 332 may protect the prism sheet 334, i.e., from external impacts.

The optical member 330 may include the diffusion sheet 336, the prism sheet 334, and the protective sheet 332. At least one of the diffusion sheet 336, the prism sheet 334, and the protective sheet 332 may be provided in a plural number of sheets, or one of the diffusion sheet 336, the prism sheet 334, and the protective sheet 332 may be omitted.

A reflective sheet 340 may be disposed under the light guide plate 310 to reflect the light leaked from the light guide plate 310 without being directed to the display panel 100. The reflective sheet 340 may be disposed on the lower cover 420 to reflect the light generated by the light source part 320. As a result, the amount of the light provided to the display panel 100 may be increased by the reflective sheet 340.

The upper cover 410 may be disposed on the display panel 100 and have a shape corresponding to the display panel 100. The upper cover 410 may include a display window 411 formed therethrough to expose the display area 140 of the display panel 100. The upper cover 410 may include an upper surface 412 supporting a front end of the display panel 100 and an upper cover side surface 414 downwardly extended from the upper surface 412 to the lower cover 420. If the display panel 100 has a rectangular plate shape, the upper cover side surface 414 includes four side surfaces. The upper cover 410 may be coupled with the lower cover 420 to support the front end of the display panel 100.

The lower cover 420 may be disposed under the backlight unit 300. The lower cover 420 may include a bottom surface 422 corresponding to the shape of the display panel 100 and the backlight unit 300 and a lower cover side surface 424 upwardly extended from the bottom surface 422. If the display panel 100 and the backlight unit 300 have the rectangular plate shape, the lower cover side surface 424 includes four side surfaces. Thus, the lower cover 420 may provide a receiving space to accommodate the display panel 100 and the backlight unit 300. Further, the lower cover 420 may be coupled with the upper cover 410 to receive and hold the display panel 100 and backlight unit 300 therein.

Figure 2:
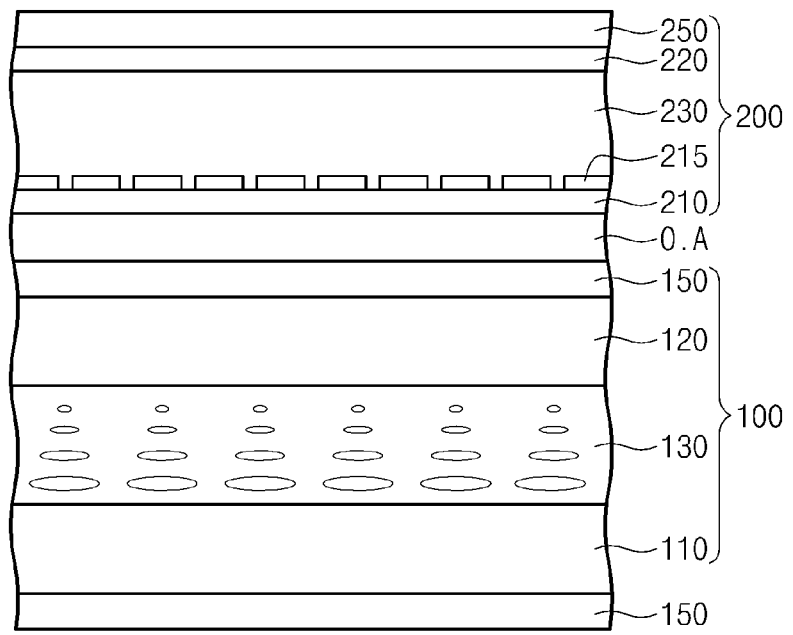
FIG. 2 is a cross-sectional view showing a portion of a display panel and a shutter panel of the 3D image display apparatus shown in FIG. 1 according to an exemplary embodiment of the present invention.
Figure 3:
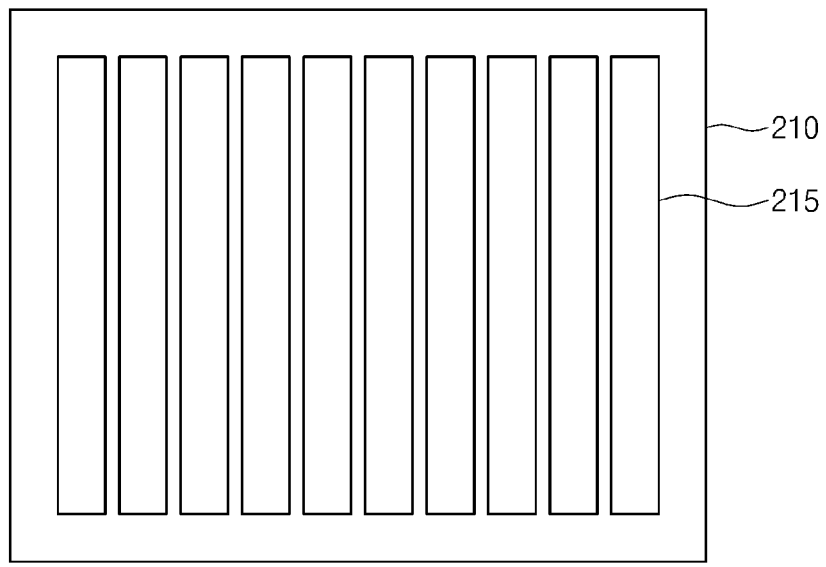
FIG. 3 is a plan view showing a substrate, on which an electric field forming electrode is formed, employed in the shutter panel shown in FIG. 1 according to an exemplary embodiment of the present invention.

FIG. 2 is a cross-sectional view showing a portion of a display panel and a shutter panel of the 3D image display apparatus shown in FIG. 1 according to an exemplary embodiment of the present invention, and FIG. 3 is a plan view showing a substrate, on which an electric field forming electrode is formed, employed in the shutter panel shown in FIG. 1 according to an exemplary embodiment of the present invention.

Referring to FIG. 2 and FIG. 3, the shutter panel 200 is disposed at the optical path in which the light exiting from the display panel 100 travels. An optical adhesive layer OA may be disposed between the display panel 100 and the shutter panel 200 to couple the display panel 100 and the shutter panel 200.

The display panel 100 may display an image using the light provided from the backlight unit 300. As described with reference to FIG. 1, if the display panel 100 is the liquid crystal display panel, the display panel 100 may include the array substrate 110, the opposite substrate 120, and the first liquid crystal layer 130 disposed between the array substrate 110 and the opposite substrate 120. The light provided from the backlight unit 300 is incident into the array substrate 110 and exits from the opposite substrate 120. Further, the opposite substrate 120 may include a first polarizing film 150 disposed on at least one surface of both surfaces of the opposite substrate 120.

The shutter panel 200 may separate the image displayed on the display panel 100 into the left-eye image and the right-eye image. The shutter panel 200 may include the first substrate 210, the second substrate 220 facing the first substrate 210 disposed at an optical path in which the light exiting from the display panel 100 travels, and the second liquid crystal layer 230 disposed between the first and second substrates 210 and 220.

The first and second substrates 210 and 220 may include at least one selected of fiber reinforced plastics (FRP), polycarbonate (PC), polyethylene terephthalate (PET), polyether sulfone (PES), or polyolefin. A thickness of the first and second substrates 210 and 220 may be about 100 μm to about 500 μm.

Further, a distance between the first substrate 210 and the second substrate 220 is less than or equal to about 15 micrometers. The brightness of the light exiting from the shutter panel 200 may be lowered if the distance between the first substrate 210 and the second substrate 220 is larger than about 15 micrometers.

Further, the first substrate 210 may include a plurality of electric field forming electrodes 215 disposed on a surface of the first substrate 210 making contact with the second liquid crystal layer 230. The electric field forming electrodes 215 may have a stripe shape and may be substantially parallel to each other. The electric field forming electrodes 215 may be disposed to be inclined to a light transmission axis of the first polarizing film 150 in an angle of about 45 degrees or about 135 degrees.

The electric field forming electrodes 215 may include a transparent conductive material, such as indium tin oxide (ITO), indium zinc oxide (IZO), etc., to prevent the deterioration in brightness of the image exiting from the shutter panel 200. Further, since the electric field forming electrodes 215 may be disposed on either the first substrate 210 or the second substrate 220, the electric field forming electrodes 215 may form a horizontal electric field.

The second liquid crystal layer 230 may include a nematic liquid crystal, a cholesteric liquid crystal, or a blue-phase liquid crystal. If the second liquid crystal layer 230 includes the blue-phase liquid crystal, the blue-phase liquid crystal may be a polymer-stabilized blue-phase liquid crystal that is coupled with a polymer and stabilized. The blue-phase liquid crystal may be a liquid crystal phase within a temperature range of a chiral nematic phase to an isotropic phase. The blue-phase liquid crystal has a refractive index determined according to areas in which the electric field is formed, and thus the blue-phase liquid crystal may have uniform brightness without being related to the uniformity of the cell gap when the electric field is uniformly formed.

Further, if the second liquid crystal layer 230 includes the blue-phase liquid crystal, the second liquid crystal layer 230 has the thickness less than or equal to about 15 micrometers, as the distance between the first and second substrates 210 and 220, to prevent the brightness of the light exiting from the shutter panel 200 from being lowered by the second liquid crystal layer 230.

Further, since the blue-phase liquid crystal does not need to be aligned, the shutter panel 200 may exclude a separate alignment layer. Accordingly, a high-temperature process for the alignment layer may be omitted, so the first and second substrates 210 and 220 having relatively thin thickness may be applied to the shutter panel 200 without using thicker glass substrates for the first and second substrates 210 and 220.

The blue-phase liquid crystal has an anisotropic refractive index varied in proportion to the square of the voltage applied to the blue-phase liquid crystal (the Kerr effect). The shutter panel 200 transmits the light using the Kerr effect of the blue-phase liquid crystal, in which the refractive index is in proportion to the square of the voltage. As a result, the response speed of the shutter panel 200 may be improved.

If the power source is applied to the electric field forming electrodes 215, the horizontal electric field is formed in the second liquid crystal layer 230 and the anisotropic refractive index of the blue-phase liquid crystals of the second liquid crystal layer 230 is varied by the horizontal electric field, thereby controlling the light transmittance of the second liquid crystal layer 230.

Further, a second polarizing film 250 may be disposed on a surface of the second substrate 220, from which the light exits. The second polarizing film 250 may include a λ/4 phase difference film. The second polarizing film 250 may have a slow axis (or a fast axis) inclined with respect to the light transmission axis of the first polarizing film 150 at an angle of about 45 degrees or about 135 degrees. Thus, the light exiting from the second polarizing film 250 may be a circularly polarized light. The first polarizing film 150 may be a linear polarizer and the second polarizing film 250 may be a quarter-wavelength phase shifting retarder. Specifically, the first polarizing film 150 may have a transmission axis that creates linearly polarized light. The direction of the linear polarization of the linearly polarized light is parallel to the transmission axis. The second polarizing film 250 may have the slow axis and the fast axis perpendicular to the slow axis. The light component that passes through the slow axis may cause quarter-wavelength phase shift with respect to the orthogonal light component that passes through the fast axis. The slow axis or the fast axis may be inclined with the transmission axis of the first polarizing film 150 at an angle 45 degrees or 135 degrees.

As described above, the 3D image display apparatus may include the blue-phase liquid crystal as the second liquid crystal layer 230 and the electric field forming electrodes 215 may be disposed to be inclined with respect to the light transmission axis of the first polarizing film 150 at an angle of about 45 degrees or about 135 degrees, so that the light exiting from the shutter panel 200 may be a polarized light having a phase difference of zero or λ/2. Thus, the light exiting from the second polarizing film 250 may be a circularly polarized light.

If the blue-phase liquid crystal is employed in the shutter panel 200 as the second liquid crystal layer 230, the high-temperature process to form the alignment layer may be excluded. As a result, the first and second substrates 210 and 220, which are relatively inexpensive and thinner than glass substrates, may be applied to the shutter panel 200.

Further, if the blue-phase liquid crystal is employed in the shutter panel 200 as the second liquid crystal layer 230, the response speed of the shutter panel 200 may be improved, thereby preventing cross-talk.

Further, if the first and second substrates 210 and 220 are thin, the shutter panel 200 may be manufactured by a roll-to-roll process. Accordingly, the productivity of the shutter panel 200 and the 3D image display apparatus may be improved.

Figure 4:
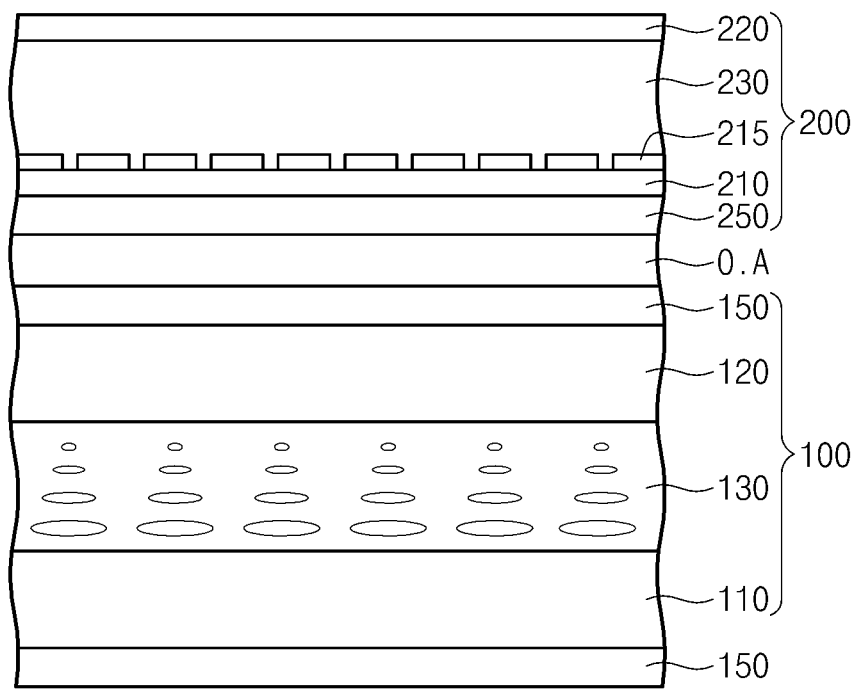
FIG. 4 is a cross-sectional view showing a display panel and a shutter panel of a 3D image display apparatus according to another exemplary embodiment of the present invention.

FIG. 4 is a cross-sectional view showing a display panel and a shutter panel of a 3D image display apparatus according to another exemplary embodiment of the present invention. In FIG. 4, the same reference numerals denote the same elements in FIG. 1, FIG. 2, and FIG. 3, and thus detailed descriptions of the same elements will be omitted.

Referring to FIG. 4, the shutter panel 200 is disposed at an optical path in which the light exiting from the display panel 100 travels.

The shutter panel 200 may include the first substrate 210 disposed at an optical path in which the light exiting from the display panel 100 travels, the second panel 200 facing the first substrate 210, and the second liquid crystal layer 230 disposed between the first substrate 210 and the second substrate 220.

Further, the second polarizing film 250 may be disposed between the first substrate 210 and the display panel 100. That is, the second polarizing film 250 may be disposed on a surface of the first substrate 210, to which the light exiting from the display panel 100 is incident. The second polarizing film 250 may include the λ/4 phase difference film. The second polarizing film 250 may have the slow axis inclined with respect to the light transmission axis of the first polarizing film 150 at the angle of about 45 degrees or about 135 degrees. Thus, the light exiting from the second polarizing film 250 may be circularly polarized light.

Further, one of the first substrate 210 and the second substrate 220, e.g., the first substrate 210, may include the electric field forming electrodes 215 disposed on the surface of the first substrate 210 making contact with the second liquid crystal layer 230. The electric field forming electrodes 215 have the stripe shape and may be substantially parallel to each other. The electric field forming electrodes 215 may be disposed in any direction without being related to the light transmission axis of the first polarizing film 150 in an angle of about 45 degrees or about 135 degrees. That is, the electric field forming electrodes 215 may be arranged in a random direction without being related to the light transmission axis of the first polarizing film 150. This is because the light exiting from the second polarizing film 250 is the circularly polarized light.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A three-dimensional image display apparatus comprising:
   a display panel configured to display an image; and
   a shutter panel configured to separate the image into a left-eye image and a right-eye image, the shutter panel comprising:
   a first substrate disposed adjacent to the display panel and being a thin film type;
   a second substrate facing the first substrate and being a thin film type, the first substrate being disposed between the second substrate and the display panel; and
   a liquid crystal layer disposed between the first substrate and the second substrate.

2. The three-dimensional image display apparatus of claim 1, wherein the liquid crystal layer comprises blue-phase liquid crystals.

3. The three-dimensional image display apparatus of claim 2, wherein the liquid crystal layer comprises polymer-stabilized blue-phase liquid crystals that are coupled with a polymer and stabilized.

4. The three-dimensional image display apparatus of claim 2, wherein the first substrate and the second substrate comprise at least one selected from the group consisting of fiber reinforced plastics, polycarbonate, polyethylene terephthalate, polyether sulfone, or polyolefin.

5. The three-dimensional image display apparatus of claim 2, wherein a distance between the first substrate and the second substrate is less than or equal to about 15 micrometers.

6. The three-dimensional image display apparatus of claim 2, further comprising a first polarizing film disposed on at least one surface of the display panel.

7. The three-dimensional image display apparatus of claim 6, further comprising a second polarizing film disposed on a surface of the shutter panel, from which the light exits.

8. The three-dimensional image display apparatus of claim 7, wherein the second polarizing film has a slow axis inclined with respect to a light transmission axis of the display panel at an angle of about 45 degrees or about 135 degrees.

9. The three-dimensional image display apparatus of claim 8, wherein one of the first substrate and the second substrate comprises a plurality of electric field forming electrodes substantially parallel to each other.

10. The three-dimensional image display apparatus of claim 9, wherein the electric field forming electrodes are disposed to be inclined with respect to the light transmission axis of the first polarizing film at an angle of about 45 degrees or about 135 degrees.

11. The three-dimensional image display apparatus of claim 9, wherein a distance between the electric field forming electrodes is in a range of about 5 micrometers to about 15 micrometers.

12. The three-dimensional image display apparatus of claim 6, further comprising a second polarizing film disposed between the display panel and the shutter panel.

13. The three-dimensional image display apparatus of claim 12, wherein the second polarizing film has a slow axis inclined with respect to a light transmission axis of the display panel at an angle of about 45 degrees or about 135 degrees.

14. The three-dimensional image display apparatus of claim 2, further comprising an optical adhesive layer disposed between the display panel and the shutter panel.

15. The three-dimensional image display apparatus of claim 2, wherein the display panel is a liquid crystal display panel, an electrophoretic display panel, an organic light emitting display panel, or a plasma display panel.

16. The three-dimensional image display apparatus of claim 15, wherein the liquid crystal display panel or the electrophoretic display panel comprises a backlight unit configured to generate light.

17. The three-dimensional image display apparatus of claim 1, wherein the first substrate and the second substrate comprise at least one selected from the group consisting of fiber reinforced plastics, polycarbonate, polyethylene terephthalate, polyether sulfone, or polyolefin.

18. The three-dimensional image display apparatus of claim 1, further comprising an optical adhesive layer disposed between the display panel and the shutter panel.

19. The three-dimensional image display apparatus of claim 1, wherein the display panel is a liquid crystal display panel, an electrophoretic display panel, an organic light emitting display panel, or a plasma display panel.

20. The three-dimensional image display apparatus of claim 19, wherein the liquid crystal display panel or the electrophoretic display panel comprises a backlight unit configured to generate light.

21. A three-dimensional image display apparatus comprising:
a display panel configured to display an image; and
a shutter panel configured to separate the image into a left-eye image and a right-eye image, the shutter panel comprising:
a first thin-film substrate configured to receive light exiting from the display panel;
a second thin-film substrate facing the first substrate; and
a liquid crystal layer comprising a blue-phase liquid crystal, the liquid crystal layer being disposed between the first thin-film substrate and the second thin-film substrate.

22. The three-dimensional image display apparatus of claim 21, wherein
the display panel comprises a first polarizing film, and
the shutter panel comprises a second polarizing film having a light transmission axis inclined with respect to a light transmission axis of the first polarizing film at an angle of about 45 degrees or about 135 degrees.

23. The three-dimensional image display apparatus of claim 22, wherein the first thin-film substrate or the second thin-film substrate comprises electric field forming electrodes to form a horizontal electric field.

24. The three-dimensional image display apparatus of claim 23, wherein
the second polarizing film is disposed between the electric field forming electrodes and the display panel, and
the electric field forming electrodes are arranged in a random direction without being related to the light transmission axis of the first polarizing film.

25. The three-dimensional image display apparatus of claim 23, wherein
the electric field forming electrodes are disposed between the second polarizing film and the display panel, and
the electric field forming electrodes are disposed in a direction inclined with respect to the light transmission axis of the first polarizing film at an angle of about 45 degrees or about 135 degrees.

26. The three-dimensional image display apparatus of claim 21, further comprising an optical adhesive layer disposed between the display panel and the first thin-film substrate.

27. The three-dimensional image display apparatus of claim 21, wherein the blue-phase liquid crystal comprises a liquid crystal phase within a temperature range of a chiral nematic phase to an isotropic phase.

28. The three-dimensional image display apparatus of claim 21, wherein a distance between the first thin-film substrate and the second thin-film substrate is less than or equal to about 15 micrometers.

29. The three-dimensional image display apparatus of claim 21, wherein the shutter panel excludes an alignment layer.

30. A three-dimensional image display apparatus comprising:
a display panel configured to display an image; and
a shutter panel configured to separate the image into a left-eye image and a right-eye image, the shutter panel comprising:
a first thin-film substrate configured to receive light exiting from the display panel;
a second thin-film substrate facing the first substrate;
a liquid crystal layer disposed between the first thin-film substrate and the second thin-film substrate; and
a polarizing film configured to generate a circularly polarized light.

* * * * *